(No Model.)
M. A. WILCOX.
DOUGH MIXER.
No. 509,987. Patented Dec. 5, 1893.
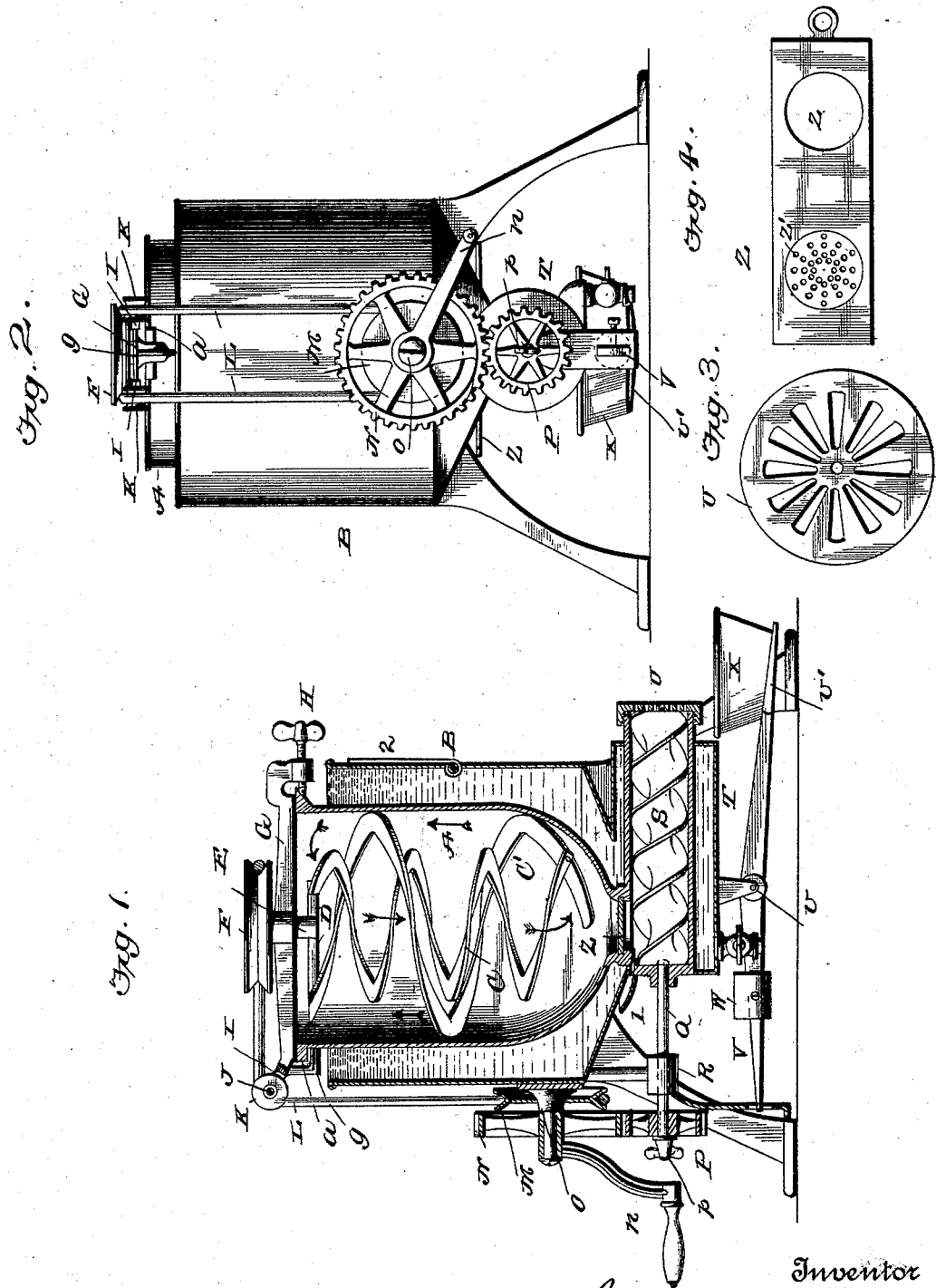
Witnesses
John Danie
Thos E. Robertson
Inventor
Margaret A. Wilcox
By T. J. W. Robertson
Attorney

UNITED STATES PATENT OFFICE.

MARGARET A. WILCOX, OF CHICAGO, ILLINOIS.

DOUGH-MIXER.

SPECIFICATION forming part of Letters Patent No. 509,987, dated December 5, 1893.

Application filed December 14, 1892. Serial No. 455,168. (No model.)

*To all whom it may concern:*

Be it known that I, MARGARET A. WILCOX, a citizen of the United States of America, residing at Chicago, Cook county, Illinois, have invented certain new and useful Improvements in Dough-Mixers, of which the following is a specification, reference being had therein to the accompanying drawings.

This improvement is designed to provide a simple cheap machine mainly intended for mixing dough for bread, cake, &c., which can however be used for making ice cream, churning, beating eggs, &c., and may be either made of a small size for family use or of a larger size for hotels, bakers, &c.

To these ends the invention consists in the peculiar arrangement, construction and combinations of parts hereinafter more particularly described and then definitely claimed.

In the accompanying drawings—Figure 1 is a vertical central section of a machine constructed according to my improvement. Fig. 2 is a back view of the machine. Figs. 3 and 4 are detached parts whose uses will be hereinafter explained.

Referring now to the details of the drawings by letters and figures—A represents the mixing cylinder surrounded by water jacket B, having a bib to allow of the water passing out when required. In the cylinder work two spiral agitators C C', one being a right spiral and the other a left. These agitators are attached to arms D, extending from the shaft E of the belt pulley F, which shaft works in a bearing in the cross bar G, one end of which has a clip $g$ that passes under a lip $a$ on the cylinder A and its other end is provided with a set screw H to secure the cross bar on the top of the cylinder. Extending from this cross bar are two arms I in which is a round rod J, carrying the guide pulleys K, for the belt L which passes around the pulley F, and the driving pulley M connected to or cast with the gear wheel N, which is mounted on a stud O attached to the water jacket B, and gears with a pinion P, secured by a set screw $p$, on a shaft Q, working in a bearing R, and driving a conveyer or screw S set in a horizontal feeding cylinder T, whose outer end is partially closed by a perforated cap U (see Fig. 3) which also forms a bearing for the outer end of the screw.

Beneath the cylinder T is a scale beam V having its fulcrum at $v$ and carrying an adjustable weight W on one arm and provided with a support $v'$ for a pan X on the other.

At Z (see Fig. 4) is shown a sliding valve for closing the bottom of the mixing cylinder, as shown in Fig. 1, and having a large opening $z$ at one end substantially of the size of the aperture in the bottom of the cylinder and a series of smaller holes $z'$ like a strainer at the other end.

A funnel is provided at 1 which serves the double purpose of allowing the escape of air forced out of the dough at this point and also as a means of admitting butter, lard or other material as a lubricant.

A thermometer is shown at 2 so that the heat of the water may be seen in order that more hot water may be added to keep the temperature at the right degree or about 110°.

The operation in making bread, cake, &c., is as follows: The materials being weighed and measured, the water jacket being filled with water at a temperature of 110° and the valve Z in its central position, the liquids are put into the mixing cylinder and the agitators set in motion by turning the handle $n$ on the gear wheel N, and the flour introduced in small but regular quantities until all is well mixed, which can be readily done in from seven to ten minutes. The mixture is then left to rise, which will take about three quarters of an hour. When the dough has risen enough, which may be seen by marks that may be made on the side of the mixing cylinder, the mixing goes on again for ten or fifteen minutes according to the quantity of dough, and the valve is then moved to bring either the single large hole $z$ or the small holes $z'$ under the aperture in the bottom of the mixing cylinder, according to circumstances. In some cases it may be advisable to use the small holes, but where the dough is stiff the large hole may be employed. This being done and the machine again operated, the mixing continues, but the dough also passes down into the lower cylinder and is forced through it by the screw and out through the perforations in the cap U into the pan X until enough has dropped into it to overbalance the weight W when the pan descends, thus showing the operator that sufficient dough is contained in the pan and that the operation of the screw or forcing apparatus should be stopped. The pan is then removed and another substituted to be filled as before, until all the dough has been used.

I prefer that the lever or beam supporting the pan shall extend to the rear near the handle, in order that when the apparatus is large enough to hide the pan from the view of the person turning the handle, he or she can see by the position of the rear end of the lever when the pan has descended and thus know when to stop the operation of the forcing device. By this means bread, biscuits, cake, &c., may be thoroughly, conveniently and easily mixed without touching the same with the hands and a much better result produced than by the usual "hap-hazard" way of making such articles.

I have described the operation as it would be if the pinion P were fast on the shaft Q, but I prefer to make the pinion movable so that it may be removed while the mixing is going on, and then secured in position when the dough is to be fed into the pans by the revolving screw.

I deem it important that the screws in the mixers are of different diameters and have their spirals set in opposite directions, inasmuch as this causes the dough to be more thoroughly mixed, as the inner spiral continually forces down the dough or other material from the top, while the outer spiral is carrying up the material from the bottom.

What I claim as new is—

1. The combination in a mixer and with the mixing cylinder thereof, of two spiral agitators, set on the same shaft one within the other, having their spirals of different diameters and running in opposite directions, and means for giving said spirals a revolving motion in the same direction, substantially as described.

2. The combination in a mixer, of a mixing cylinder, an agitating device, a pulley mounted on the shaft thereof, a removable cross-bar forming a bearing for said agitating device, guide pulleys supported by said cross-bar, and a pulley for driving a belt running over said guide pulleys and operating the agitator, substantially as described.

3. The combination in a mixer, of a mixing cylinder A having a lip $a$, an agitating device, a pulley mounted on the shaft thereof, a removable cross-bar forming a bearing for the shaft of said agitating device and having a clip and set screw engaging with the lip $a$, guide pulleys supported by said cross-bar, a driving pulley for operating a belt running over the guide pulleys and rotating the agitating device, a gear wheel connected to said driving pulley, a pinion operated by said gear wheel, a screw operated by said pinion, and a cylinder inclosing said screw and having its interior connected with the mixing cylinder, substantially as described.

In testimony whereof I affix my signature, in presence of two witnesses, this 12th day of December, 1892.

MARGARET A. WILCOX.

Witnesses:
EDWIN B. CADWELL,
MARY GORTON CARR.